(12) United States Patent
Hojo et al.

(10) Patent No.: US 7,264,834 B2
(45) Date of Patent: Sep. 4, 2007

(54) FOOD-ADDITIVE SLURRY COMPOSITION AND POWDER COMPOSITION, AND FOOD COMPOSITION CONTAINING THESE

(75) Inventors: Hisakazu Hojo, Hyogo (JP); Naoki Kubota, Hyogo (JP)

(73) Assignee: Maruo Calcium Company Limited, Akashi-shi (JP)

( * ) Notice: Subject to any disclaimer, the term of this patent is extended or adjusted under 35 U.S.C. 154(b) by 130 days.

(21) Appl. No.: 10/489,302

(22) PCT Filed: Sep. 19, 2001

(86) PCT No.: PCT/JP01/08119

§ 371 (c)(1),
(2), (4) Date: Mar. 16, 2004

(87) PCT Pub. No.: WO03/026446

PCT Pub. Date: Apr. 3, 2003

(65) Prior Publication Data

US 2004/0234651 A1 Nov. 25, 2004

(51) Int. Cl.
*A23L 1/304* (2006.01)
(52) U.S. Cl. .................... 426/74; 426/518; 426/654
(58) Field of Classification Search ............ 426/74, 426/654, 518
See application file for complete search history.

(56) References Cited

FOREIGN PATENT DOCUMENTS

| | | |
|---|---|---|
| EP | 0 870 435 A1 | 10/1998 |
| JP | 08-332053 | 12/1996 |
| JP | 10-136940 | 5/1998 |
| JP | 2000-093124 | 4/2000 |
| JP | 2000-102365 | 4/2000 |
| JP | 2001-029052 | 2/2001 |
| JP | 2001-061443 | 3/2001 |
| WO | WO 01/47376 A1 | 7/2001 |

OTHER PUBLICATIONS

International Search Report dated Nov. 20, 2001.
Supplementary European Search Report dated Oct. 20, 2004.

*Primary Examiner*—Helen Pratt
(74) *Attorney, Agent, or Firm*—Kratz, Quintos & Hanson, LLP

(57) ABSTRACT

A food additive slurry composition which comprises 100 parts by weight of at least one magnesium ingredient selected from the group consisting of magnesium hydroxide, magnesium silicate, magnesium oxide, magnesium phosphate and magnesium hydrogen phosphate, and 2 to 55 parts by weight of at least one emulsion stabilizer selected from the group consisting of polyglycerol fatty acid ester, gum arabic, processed starch, sucrose fatty acid ester having an HLB of 8 or higher, carboxymethyl cellulose (hereinafter, referred to as CMC), methyl cellulose (hereinafter, referred to as MC), propylene glycol alginate (hereinafter, referred to as PGA), water-soluble soybean polysaccharide, condensed phosphate, gum ghatti, phospholipid and arabino galactan is provided. The food additive composition can be highly concentrated and is excellent in flavor as well as dispersibility in liquid.

13 Claims, No Drawings

FOOD-ADDITIVE SLURRY COMPOSITION AND POWDER COMPOSITION, AND FOOD COMPOSITION CONTAINING THESE

TECHNICAL FIELD

The present invention relates to a food additive slurry composition and powder composition which are effectively utilized for enriching magnesium by adding to foods such as yogurt, cow milk, juice, milk powder and the like, are highly concentrated and have the excellent dispersion stability in a solution, and food compositions containing these compositions.

BACKGROUND ART

Recently, an attention has been paid to the action of magnesium in a living body. Magnesium has the actions of relaxing and dilating muscle and blood vessel, and is an indispensable mineral to a human being. When magnesium is deficient, it is considered that a human being easily suffers from hypertension, angina pectoris and hyperlipemia. In addition, magnesium is greatly involved in calcium metabolism and, when magnesium is deficient, various symptoms accompanied with calcium metabolism abnormality are manifested. Further, it is said that magnesium is associated with many enzyme reactions, and maintains homeostasis in a living body. However, recently, since a diet life has been europeanized and Japanese people have begun to take cereals having a high polishing degree, and magnesium is considerably reduced at a stage of purifying and processing a food, there is a tendency that magnesium is deficient in a diet life of modern people, and an attention is paid to magnesium-enriched products.

For example, in refreshing beverage, for the purpose of enriching a magnesium component, water-soluble magnesium such as magnesium chloride, magnesium sulfate and the like, water-insoluble or hardly soluble magnesium in an inorganic form such as magnesium oxide and the like are added and used. However, water-soluble magnesium in an organic or inorganic form has a defect that it is considerably bitter, an addition amount thereof is limited because of a flavor problem which is a great factor in foods, and use in a large amount is impossible. In addition, when a water-insoluble or hardly soluble magnesium ingredient in an inorganic form such as magnesium oxide and the like is used, a specific gravity is as high as 2.1 or higher and, when dispersed in a refreshing beverage, the ingredient is precipitated in a short time. Therefore, this is not preferable from a viewpoint of eating feeling and beauty appearance as a food and, consequently, an addition amount is limited like water-soluble magnesium ingredient, thus, such the magnesium has a defect that it can not be used in a large amount.

As a method which compensates for this defect and can add a large amount of magnesium for food uses, JP-A No. 2000-83622 proposes a method for improving the dispersibility of calcium carbonate and magnesium carbonate by mixing at least one dispersing agent selected from sorbitan fatty acid ester, glycerol fatty acid ester, propylene glycol fatty acid ester, sucrose fatty acid ester, soybean phospholipid and condensed phosphate with calcium carbonate and magnesium carbonate. In Example thereof, there is described a process for preparing a 20 wt % mixed slurry in which calcium carbonate and magnesium carbonate are mixed at a ratio of 2:1. However, although a mixed slurry obtained by this process has the improved dispersibility as compared with the previous magnesium ingredient, its average particle diameter is around about 0.5 μm, thus, it can not be said that the slurry has the sufficiently dispersed state. In addition, since an amount of particles in a crude particle region of 1 μm or larger is 17.4% by weight, cow's milk to which a mixed slurry obtained by this process is added has a deteriorated yield of magnesium carbonate in a centrifugal classifying machine such as a clarifier and the like in its manufacturing step, and is easily precipitated in foods such as cow's milk and the like. Thus, it can not be said that the physical property thereof is sufficient for retaining the long term dispersibility. Further, it can not be said that a mixed slurry having the solid matter concentration of around 20% by weight has the sufficient economical property.

Recently, with progress of a container and a storage method which can store liquid foods such as cow's milk, yogurt, juice and the like for a long term, in more cases, the foods are stored in shops, vending machines, and large refrigerators in home for a long term. A water-insoluble or hardly soluble magnesium particle in an inorganic form which is added to the same kind foods for the purpose of enriching magnesium is precipitated on a bottom of a food container during long term storage of liquid foods when the dispersed state in the foods is not extremely excellent. And, when ones drink liquid foods such as cow's milk and juice, the precipitate gives unpleasant feeling and dirty feeling to drinkers.

Therefore, in liquid foods to which an inorganic particle such as water-insoluble or hardly soluble magnesium in an inorganic form prepared by the conventional technique is added for the purpose of enriching magnesium and which are currently sold, since a dispersion stable term of the inorganic particle in foods is short, it is necessary that an amount of the inorganic particle to be added is limited to an extremely small amount, and it is necessary that such the liquid foods are limited to liquid foods which general consumers must use for eating within 1 to 2 days from purchasing, thus being inconvenient.

In view of the such circumstances, the present invention solved the above problems and provides a food additive slurry composition and powder composition which have the very high concentration leading to excellent distribution economical property, and have the suitable high dispersibility as an additive to foods such as cow's milk and the like, and food compositions containing these.

DISCLOSURE OF THE INVENTION

The first invention of the present invention features a food additive slurry composition which comprises 100 parts by weight of at least one magnesium ingredient selected from the group consisting of magnesium hydroxide, magnesium silicate, magnesium oxide, magnesium phosphate and magnesium hydrogen phosphate, and 2 to 55 parts by weight of at least one emulsion stabilizer selected from the group consisting of polyglycerol fatty acid ester, gum arabic, processed starch, sucrose fatty acid ester having an HLB of 8 or higher, carboxymethyl cellulose (hereinafter, referred to as CMC), methyl cellulose (hereinafter, referred to as MC), propylene glycol alginate (hereinafter, referred to as PGA), water-soluble soybean polysaccharide, condensed phosphate, gum ghatti, phospholipid and arabino galactan.

The second invention of the present invention features a food additive slurry composition which comprises 100 parts by weight of at least one magnesium group selected from the group consisting of magnesium carbonate, dolomite, magnesium hydroxide, magnesium silicate, magnesium oxide, magnesium phosphate and magnesium hydrogen phosphate, and 2 to 55 parts by weight of at least one emulsion stabilizer selected by the group consisting of gum arabic, PGA, gum ghatti and water-soluble soybean polysaccharide.

The third invention of the present invention features a food additive powder composition which comprises dried and powdered aforementioned food additive slurry composition.

The fourth invention of the present invention features a process for preparing the aforementioned food additive slurry composition which comprises using at least one selected from a wet grinding machine, a high pressure emulsifying and dispersing apparatus, and an ultrasonic dispersing machine.

The fifth invention of the present invention features a food composition which contains the aforementioned food additive slurry composition and powder composition.

BEST MODE FOR CARRYING OUT THE INVENTION

Magnesium hydroxide used in the present invention is prepared, for example, by reacting a lime milk with a solution obtained by decarbonizing sea water, to obtain colloidal magnesium hydroxide, and washing and dehydrating the resulting aqueous suspension of magnesium hydroxide repeatedly, followed by drying and grinding.

As magnesium silicate used in the present invention, any of natural magnesium silicate such as magnesium orthosilicate, hydrated magnesium silicate and the like, and magnesium trisilicate may be used and, preferably, chemically synthesized magnesium trisilicate is used.

As a process for preparing magnesium trisilicate, there can be exemplified a process of adding magnesium chloride to a sodium silicate solution, stirring the materials to prepare an aqueous suspension of magnesium trisilicate, and washing and dehydrating the resulting aqueous suspension of magnesium trisilicate repeatedly, followed by drying and grinding.

Magnesium oxide used in the present invention is prepared by a method of firing magnesium carbonate at a high temperature, or by a method of adding calcium hydroxide to sea water or an aqueous magnesium chloride solution to produce magnesium hydroxide, which is sufficiently washed with water, dehydrated, dried, and fired at 500° C. or higher.

Magnesium phosphate used in the present invention is prepared, for example, by adding sodium hydrogen carbonate to an aqueous solution of magnesium sulfate and disodium hydrogen phosphate to react them in the weak alkaline state, to prepare an aqueous suspension of magnesium phosphate, and washing and dehydrating the resulting aqueous suspension of magnesium phosphate repeatedly, followed by drying and grinding.

Magnesium hydrogen phosphate used in the present invention is prepared, for example, by reacting magnesium oxide with a phosphoric acid solution to prepare an aqueous suspension of magnesium hydrogen phosphate, which is dehydrated, dried and ground.

Magnesium carbonate used in the present invention is prepared, for example, by adding an alkali carbonate solution to a soluble aqueous magnesium solution to mix them while heating at 60 to 80° C., to obtain a precipitate, filtering the precipitate, and repeating the procedure of adding warm water and filtering several times, followed by drying and wet grinding. In order to obtain a finer dispersion, it is preferable to use light magnesium carbonate.

As dolomite used in the present invention, natural dolomite and synthetic dolomite having magnesium at 10% by weight or larger can be used. When natural dolomite is used, dolomite is ground using an H mill, a vertical mill, a ball mill or a roll mill, and then used. Synthetic dolomite is obtained, for example, by a hydrothermal reaction of magnesium chloride, calcium chloride and calcium carbonate.

In addition, a specific surface area of the aforementioned magnesium ingredient used in the present invention as a raw material by a nitrogen absorption method (BET method) is preferably in a range of 1 to 50 $m^2/g$. When a specific surface area is smaller than 1 $m^2/g$, there arises a problem of the long term stability in liquid foods such as cow's milk and the like. On the other hand, when a specific surface area exceeds 50 $m^2/g$, since a cohesive force of a magnesium ingredient or a magnesium group becomes extremely strong, its dispersion becomes difficult.

Examples of the magnesium ingredient used in the present invention include magnesium hydroxide, magnesium silicate, magnesium oxide, magnesium phosphate and magnesium hydrogen phosphate. These are used alone or in combination of two or more. In order to prepare a food additive slurry composition having the better dispersibility, it is preferable to use magnesium silicate, magnesium oxide or magnesium phosphate.

Examples of the magnesium group used in the present invention include magnesium carbonate, dolomite, magnesium hydroxide, magnesium silicate, magnesium oxide, magnesium phosphate, magnesium hydrogen phosphate and the like. These are used alone or in combination of two or more. From a viewpoint that a food additive slurry composition dispersable easily is easily prepared, it is preferable to use magnesium carbonate or dolomite.

As the emulsion stabilizer used in the present invention, at least one selected from the following (P) group is used when a magnesium ingredient is used. In order to prepare a food additive slurry composition having the better dispersibility, preferably at least one selected from the following (Q) group is used. Further preferably, at least one selected from the following (R) group is used. In addition, when a magnesium group is used, at least one selected from the following (S) group is preferable.

(P) group: polyglycerol fatty acid ester, gum arabic, processed starch, sucrose fatty acid ester having an HLB of 8 or higher, carboxymethyl cellulose (CMC), methyl cellulose (MC), propylene glycol alginate (PGA), water-soluble soybean polysaccharide, condensed phosphate, gum ghatti, phospholipid and arabino galactan, (Q) group: polyglycerol fatty acid ester, gum arabic, processed starch, PGA, water-soluble soybean polysaccharide, condensed phosphate, gum ghatti, phospholipid and arabino galactan, (R) group: gum arabic, processed starch, PGA, water-soluble soybean polysaccharide, gum ghatti and arbino galactan, (S) group: gum arabic, PGA, water-soluble soybean polysaccharide and gum ghatti.

Sucrose fatty acid ester used in the present invention is a sucrose fatty acid ester which complies with food additive specification and has an HLB of 8 or higher. Inter alia, a sucrose fatty acid ester having an HLB of 15 or higher is preferable. In a fatty acid composition in a sucrose fatty acid ester, a sucrose fatty acid ester having a ratio of fatty acid of a carbon number of 18 in the fatty acid being 50% by weight or larger is preferable, more preferably 60% by weight or larger, further preferably 65% by weight or larger. When a ratio of fatty acid of a carbon number of 18 in the fatty acid composition in sucrose fatty acid ester is smaller than 50% by weight, there is a tendency that the stability of a magnesium ingredient or a magnesium group in foods such as cow's milk and the like becomes deficient, besides, bitterness is exhibited in flavor, thus being not preferable.

In addition, a content of an alkali metal salt of fatty acid in a food additive slurry composition is preferably 0.1 to 2.0% by weight, more preferably 0.3 to 1.5% by weight, further preferably 0.5 to 1.5% by weight relative to a sucrose fatty acid ester. When the content is smaller than 0.1% by weight, there is a tendency that the solubility of a sucrose fatty acid ester in cold water is suppressed and, as a result, since the stability of a magnesium ingredient or a magnesium group in foods such as cow's milk and the like becomes deficient, thus being not preferable. When the content exceeds 2.0% by weight, use as a food additive is not preferable.

Examples of the polyglycerol fatty acid ester used in the present invention include various fatty acid esters such as triglycerol, pentaglycerol, hexaglycerol, decaglycerol and the like, and a self-emulsifying type monoglycerol fatty acid ester and the like. Polyglycerol fatty acid ester having an HLB of 8 to 18 is preferable. More preferably, fatty acid esters such as triglycerol and pentaglycerol are used.

As the CMC used in the present invention, any CMCs may be used as far as they comply with food additive specification. A substitution degree of a carboxymethyl group is preferably 0.3 to 2.0, more preferably 0.3 to 1.5, further preferably 0.6 to 1.0. When the substitution degree is smaller than 0.3, there is a tendency that the acid resistance, the alkali resistance, the salt resistance and the like are deficient, as a result, the stability of a magnesium ingredient or a magnesium group in foods such as cow's milk and the like is deficient, thus being not preferable. When the substitution degree exceeds 2.0, since a viscosity of an aqueous solution thereof becomes high, when used in foods such as cow's milk, drink type yogurt and the like, a viscosity of products is increased, thus being not preferable from a viewpoint of eating feeling.

Examples of the PGA used in the present invention include PGAs which comply with food additive specification and have an esterification degree of not smaller than 75% and smaller than 100%, preferably an esterification degree of not smaller than 85% and smaller than 100%, more preferably an esterification degree of not smaller than 90% and smaller than 100%. When an esterification degree is smaller than 75%, there is a tendency that the dispersibility is inferior, thus being not preferable. When an esterification degree is 100%, gelling easily occurs, thus being not preferable.

As the water-soluble soybean polysaccharide used in the present invention, any water-soluble soybean polysaccharides may be used as far as they are water-soluble polysaccharides obtained by extracting and purifying from soybean and comply with food additive specification. Water-soluble soybean polysaccharides which are composed of galactose, arabinose, galacturonic acid, xylose, flucose, glucose, rhamnose, and a sugar of polysaccharides, and have an average molecular weight of a few hundreds thousands are preferable.

As the gum arabic used in the present invention, any gums arabic are used as far as they comply with food additive specification, thus being not limited. Gum arabic having a content of proteins contained in gum arabic components being 1% or larger is preferable.

As the arabino galactan used in the present invention, any arabino galactans may be used as far as they comply with food additive specification, and arabino galactan having a molecular weight of ten thousands or larger is preferable.

Examples of the phospholipid used in the present invention include vegetable (soybean, rapeseed, corn, cotton seed) lecithin, high purity lecithin, fractionated lecithin, enzyme-treated lecithin, enzyme-decomposed lecithin and the like which comply with food additive specification. Lecithin having an HLB of 8 or higher is preferable. However, lecithin has a slight problem in flavor, and animal (such as yolk) lecithin, high purity lecithin and the like are preferable from a viewpoint of flavor.

A kind of the processed starch used in the present invention is not particularly limited, but in order to retain the very excellent stability in drinks which can be stored for a long term, starches obtained by at least one kind of reactions such as oxidation, acid treatment, enzyme treatment, esterification, etherification, cross-linking and the like, that is, starches obtained by one or two or more reactions such as acid-treated starch, oxidized starch, enzyme-denatured dextrin, esterified starch, etherified starch and cross-linked starch are preferable. In particular, octenyl succinic acid ester starch is preferable. Octenyl succinic acid starch is usually obtained by making a starch suspension slightly alkaline, and adding an octenyl succinic acid suspension dropwise. Alternatively, starches which were subjected to the aforementioned other treatments and/or a mixture thereof can be used. Examples of the aforementioned processed starch include PURITY GUM 1773, PURITY GUM 2000, N-CREAMER 46 and CAPSULE (all trade names manufactured by National Starch), Emulstar 30A (trade name manufactured by Matsutani Kagaku Kogyo K. K.) and the like.

In addition, a kind of a raw material of the starch used in the present invention is not particularly limited, but from a viewpoint of the stability of a viscous solution and a viscosity, waxy corn starch is preferable.

Then, a food additive slurry composition of the aforementioned magnesium ingredient or magnesium group, and an emulsion stabilizer and water is prepared.

This process is roughly classified into the following three kinds of (i), (ii) and (iii), but any of them may be used, or a combination thereof may be used.

(i) An aqueous suspension of a food additive composed of a magnesium ingredient or a magnesium group and water is subjected to grinding and/or dispersing treatment by a chemical dispersing method, or a physical method using a grinding machine and/or a dispersing machine, followed by treatment by addition of an emulsion stabilizer.

(ii) An aqueous suspension of a food additive composed of a magnesium ingredient or a magnesium group, an emulsion stabilizer and water is subjected to grinding and/or dispersing treatment by a chemical dispersing method, or a physical method using a grinding machine and/or a dispersing machine.

(iii) An aqueous suspension of a food additive composed of a magnesium ingredient or a magnesium group and water is subjected to grinding and/or dispersing treatment by a chemical dispersing method, or a physical method using a grinding machine and/or a dispersing machine, an emulsion stabilizer is added, and the resulting mixture is subjected to grinding and/or dispersing treatment by a physical method using a grinding machine and/or a dispersing machine.

In the aforementioned (i), (ii) and (iii), the indispensable condition for preparing a food additive slurry composition of a magnesium ingredient or a magnesium group, an emulsion stabilizer and water is that an emulsion stabilizer is contained in an amount of 2 to 55 parts by weight relative to 100 parts by weight of a magnesium ingredient or a magnesium group in the food additive slurry composition and, when eating feeling such as passing throat and the like in liquid foods such as yogurt, cow's milk and the like is taken into consideration, an emulsion stabilizer is contained preferably in an amount of 3 to 45 parts by weight, more preferably in an amount of 4 to 30 parts by weight.

In the case of an amount of an emulsion stabilizer being smaller than 2 parts by weight, even if a weight average diameter in a particle size distribution of a magnesium ingredient or a magnesium group in a food additive slurry composition is adjusted to very fine, when the food additive slurry composition is used by adding to foods such as cow's milk, juice, drink type yogurt and the like, the stability with time of a magnesium ingredient or a magnesium group in foods is deteriorated and, in a worse case, a magnesium ingredient or a magnesium group is aggregated and settled on a bottom of a food container within 24 hours. On the other hand, when an amount of an emulsion stabilizer exceeds 55 parts by weight, when the food additive slurry composition is used by adding to foods such as cow's milk, juice, drink type yogurt and the like, not only a viscosity of products is increased and eating feeling is not preferable, but also as a viscosity of foods is increased, manufacturing at the high concentration becomes difficult in handling, and manufacturing must be performed at the decreased solid matter concentration, thus being not preferable in an economical respect.

A magnesium ion content M (mg/l) in the food additive slurry composition used in the present invention complies with preferably the following (a) requirement, more preferably the following (b) requirement, further preferably the following (c) requirement. When a magnesium ion content M (mg/l) is smaller than 5, since the surface stability of a magnesium ingredient or a magnesium group becomes deteriorated, and a magnesium ingredient or a magnesium group becomes easy to re-aggregate, there is a tendency that stable products are difficult to be obtained when used in cow's milk or the like. On the other hand, when M exceeds 1000, there is a tendency that a flavor such as bitterness is remarkably deteriorated when used in cow's milk or the like, thus being not preferable.

(a) $5 \leq M \leq 1000$ (b) $7 \leq M \leq 450$ (c) $10 \leq M \leq 250$

M: a magnesium content (mg/l) of a solution obtained by adjusting a food additive slurry after grinding and/or dispersing to 10% by weight, performing centrifugation at 10,000 rpm for 10 minutes, and filtering the resulting supernatant with a 0.8 μm filter In addition, a magnesium ion content in the present invention was measured and calculated by the following details:

Kind of a measuring machine: atomic absorption spectrophotometer AA-6700 F manufactured by Shimadzu Corporation.

Preparation of a sample: A sample is obtained by adjusting a food additive slurry after grinding and/or dispersing to 10% by weight, performing centrifugation at 10,000 rpm for 10 minutes, and filtering the resulting supernatant with a 0.8 μm filter.

Solvent: Distilled Water

A weight average diameter K(μm) in a particle size distribution of a magnesium ingredient or a magnesium group in a food additive slurry composition should comply with preferably the following (α) requirement and, in food uses requiring the fairly long term storage dispersion stability, preferably (β) requirement, further preferably (γ) requirement.

$\alpha\ 0.1 \leq K \leq 1.0$ $\beta\ 0.1 \leq K \leq 0.6$ $\gamma\ 0.1 \leq K \leq 0.4$ When a weight average diameter in a particle size distribution of a magnesium ingredient or a magnesium group in a food additive slurry composition is larger than 1.0 μm, since a particle is easily settled, these food additive slurry compositions can not be used in uses of foods which can be stored for a long term. As a method of adjusting a weight average diameter in a particle size distribution of a magnesium ingredient or a magnesium group in a food additive slurry composition to 1.0 μm or smaller, the aforementioned method may be used. Regarding a grinding and/or dispersing method by a physical method, a wet grinding machine such as a dino mill, a sand mill, a cobor mill and the like, an emulsifying and dispersing apparatus such as a nanomizer, a microfluidizer, homogenizer and the like, and a roll mill such as an ultrasonic dispersing machine and the like can be preferably used.

A weight average diameter in a particle size distribution of a magnesium ingredient or a magnesium group in the food additive slurry composition in the present invention is measured and calculated by the following details:

Kind of a measuring machine: SA-CP4L manufactured by Shimadzu Corporation

Preparation of a sample: A food additive slurry composition is added dropwise to the following solvent at 20° C. to obtain a sample for measuring a particle size distribution.

Solvent: Ion-exchanged Water

Preliminary dispersion: Ultrasonic dispersion for 100 seconds using an SK disperser (manufactured by Seishinkigyo)

Measuring Temperature: 20.0° C. ±2.5° C.

The food additive powder composition of the present invention is prepared by drying and powdering the thus prepared food additive slurry composition of at least one selected from the group consisting of a magnesium ingredient or a magnesium group, an emulsion stabilizer and water. Regarding drying of a food additive slurry composition, a dryer is not particularly limited, but from a viewpoint of prevention of denaturation of various surface treating agents, it is preferable to perform drying in an extremely short time. From this viewpoint, as a dryer, it is desirable to use a droplet spraying—type dryer such as a spray dryer, a slurry dryer and the like using a ceramic medium in the heat flowing state, and the like.

The food additive slurry composition or powder composition prepared by the aforementioned process has the extremely excellent re-dispersibility in water, and is easily dispersed in water without using a special dispersing machine, a stirrer or the like.

Therefore, in order to prepare a food, for example, a magnesium—enriched cow's milk using the food additive slurry composition and/or powder composition of the present invention, it is enough that the food additive slurry composition and/or powder composition of the present invention is added directly to cow's milk to vigorously stir them, to disperse the food additive slurry composition and/or powder composition in cow's milk, and it is also enough that an aqueous dispersion of a magnesium ingredient or a magnesium group obtained, in advance, by dispersing the food additive slurry composition and/or powder composition in water is added to cow's milk. In addition, in a reduced milk, the food additive slurry composition or powder composition of the present invention is added to a butter or a butter oil which has been melted at a temperature of around 60° C., the materials are stirred at a high speed to disperse them and, then, reduced defatted milk or defatted milk may be added to homogenize them.

In the magnesium-enriched cow's milk prepared by these methods, an amount of magnesium to be removed with a clarifier is considerably reduced as compared with the case where a magnesium ingredient prepared by the conventional method is added. That is, magnesium is extremely stably retained in cow's milk, yogurt, juices to which the food additive slurry composition and/or powder composition of the present invention is added. In addition, since the food additive slurry composition and/or powder composition of the present invention has the better magnesium dispersibility, a stirring time may be short upon addition to cow's milk or the like. Therefore, aggregation of magnesium which is seen when stirred in a butter for a long time does not occur. Besides the aforementioned uses, the food additive slurry composition and/or powder composition of the present invention can be used for the purpose of enriching magnesium in liquid foods such as cream, coffee, tea, oolong tea, bean milk, sports drink, near water and the like, alcohol drinks such as wine, sake and the like, foods such as cheese, gum, bread, confectionery, noodles and the like, and tablets and the like.

The food additive slurry composition or powder composition of the present invention may be used jointly with a dispersion of a water-hardly soluble calcium salt such as calcium carbonate, calcium phosphate and the like, water-soluble calcium salt such as calcium lactate, calcium chloride and the like and/or water-soluble magnesium salt such as magnesium chloride, magnesium sulfate and the like.

The present invention will be explained in detail below by way of Examples, Comparative Examples, but the present invention is not limited to only these Examples.

EXAMPLE 1

Using magnesium silicate (manufactured by Kyowa Chemical Industry Co., Ltd.), 20 parts by weight of gum arabic (content of protein:3% by weight, manufactured by Gokyosangyo) and water were added to 100 parts by weight of a solid matter of magnesium silicate, the materials were stirred and mixed to prepare a food additive slurry having the magnesium silicate solid matter concentration of 45% by weight, which was wet-ground using a wet grinding machine Dino mill KD Pilot-type (trade name manufactured by WAB) to obtain a highly concentrated food additive slurry. The results of a content M of a magnesium ion in the food additive slurry, a weight average diameter K in a particle size distribution and an amount L of particles of 1 μm or larger in a particle size distribution are shown in Table 1. A viscosity of the resulting highly concentrated food additive slurry is sufficiently low, and there was no problem of the flowability.

As gum arabic, a desalted type was used, and dissolved in water in advance and added.

COMPARATIVE EXAMPLE 1

According to the same conditions as those of Example 1 except that a part by weight of an emulsion stabilizer to be added was changed as in Table 2, a food additive slurry was obtained. The results of a content M of a magnesium ion in the food additive slurry, a weight average diameter K in a particle size distribution and an amount L of particles of 1 μm or larger in a particle size distribution are shown in Table 2.

As the concentration of the resulting food additive slurry, preparation of a food additive slurry having the magnesium ingredient solid matter concentration of 45% by weight as in Example 1 was tried, but since at that concentration, a viscosity was high and handling was difficult, the slurry was diluted to such the concentration that is not detrimental to handling and, as a result, a slurry having the solid matter concentration shown in Table 2 was prepared.

EXAMPLE 2

An aqueous slurry of tertiary magnesium phosphate (manufactured by Taiheikagaku) which had been adjusted to solid matter 40% by weight was wet-ground using Dino mill KD Pilot-type. Using the slurry after grinding, 20 parts by weight of processed starch: PURITY GUM 2000 (trade name manufactured by Nippon NSC) was added to 100 parts by weight of a solid matter of tertiary magnesium phosphate, and the materials were stirred and mixed to prepare a food additive slurry having the tertiary magnesium phosphate solid matter concentration of 34% by weight, which was wet-ground using Dino mill KD Pilot—type to obtain a highly concentrated food additive slurry. The results of a content M of a magnesium ion in the food additive slurry, a weight average diameter K in a particle size distribution and an amount L of particles of 1 μm or larger in a particle size distribution are shown in Table 1. A viscosity of the resulting highly concentrated food additive slurry was sufficiently low and, there was no problem of the flowability.

Processed starch was dissolved in water in advance and added.

COMPARATIVE EXAMPLE 2

According to the same conditions as those of Example 2 except that a part by weight of an emulsion stabilizer to be added was changed as in Table 2, a food additive slurry was obtained. The results of a content M of a magnesium ion in the food additive slurry, a weight average diameter K in a particle size distribution and an amount L of particles of 1 μm or larger in a particle size distribution are shown in Table 2.

As the concentration of the resulting food additive slurry, preparation of a food additive slurry having the magnesium ingredient solid matter concentration of 34% by weight as in Example 2 was tried, but since at that concentration, a viscosity was high and handling was difficult, the slurry was diluted to such the concentration that is not detrimental to handling and, as a result, a slurry having the solid matter concentration shown in Table 2 was prepared.

EXAMPLE 3

Using magnesium oxide (manufactured by Kyowa Chemical Industry Co., Ltd.), 15 parts by weight of arabino galactan was added to 100 parts by weight of a solid matter of magnesium oxide, the materials were stirred and mixed to prepare a food additive slurry, which was dispersed at a pressure of 6860 Pa using a high pressure homogenizer (manufactured by A.P.GAULIN) to obtain a highly concentrated food additive slurry. The results of a content M in a magnesium ion in the food additive slurry, a weight average diameter K in a particle size distribution and an amount L of particles of 1 μm or larger in a particle size distribution are shown in Table 2. As the concentration of the resulting food additive slurry, preparation of a food additive slurry having the magnesium ingredient solid matter concentration of 45% by weight as in Example 1 was tried, but since at that concentration, a viscosity was high and handling was difficult, the slurry was diluted to such the concentration that is not detrimental to handling and, as a result, a slurry having the solid matter concentration shown in Table 1 was prepared.

Arabino galactan was dissolved in water in advance and added.

EXAMPLE 4

Using magnesium hydroxide (manufactured by Tatehokagakukogyo), 45 parts by weight of water-soluble soybean polysaccharide Soya Five—S (trade name manufactured by Fujiseiyu K. K.) was added to 100 parts by weight of a solid matter of magnesium hydroxide, the materials were stirred and mixed to prepare a food additive slurry, which was ultrasonic-dispersed at 300 W and 20 kHz for 10 minutes using an ultrasonic dispersing machine US-300T (trade name manufactured by Nihon Seiki Seisakusho) to obtain a highly concentrated food additive slurry. The results of content M of a magnesium ion in the food additive slurry, a weight average diameter K in a particle size distribution and an amount L of particles of 1 μm or larger in a particle size distribution are shown in Table 1. As the concentration of the resulting food additive slurry, preparation of a food additive slurry having the magnesium ingredient solid matter concentration of 45% by weight as in Example 1 was tried, but since at that concentration, a viscosity was high and handling was difficult, the slurry was diluted to such the concentration that is not detrimental to handling and, as a result, a slurry having the solid matter concentration shown in Table 1 was prepared.

Water-soluble soybean polysaccharide was dissolved in water in advance and added.

COMPARATIVE EXAMPLE 3

According to the same conditions as those of Example 4 except that a part by weight of an emulsion stabilizer to be added was changed as in Table 2, a food additive slurry was obtained. The results of a content M of a magnesium ion in the food additive slurry, a weight average diameter K in a particle size distribution and an amount L of particles of 1 μm or larger in a particle size distribution are shown in Table 2.

As the concentration of the resulting food additive slurry, preparation of a food additive slurry having the same solid matter concentration as that of Example 4 was tried, but since at that concentration, a viscosity was high and handling was difficult, the slurry was diluted to such the concentration that is not detrimental to handling and, as a result, a slurry having the solid matter concentration shown in Table 2 was prepared.

EXAMPLES 5, 7 and 11

According to the same conditions as those of Example 1 except that the conditions were changed to those shown in Table 1, food additive slurries were obtained. The results of a content M of a magnesium ion in the resulting food additive slurry, a weight average diameter K in a particle size distribution and an amount L of particles of 1 μm or larger in a particle size distribution are shown in Table 1.

As the concentration of the resulting food additive slurries, preparation of food additive slurries having the magnesium ingredient and magnesium group solid matter concentration of 45% by weight as in Example 1 were tried, but since at that concentration, a viscosity was high and handling was difficult, the slurries were diluted to such the concentration that is not detrimental to handling and, as a result, slurries having the solid matter concentration shown in Table 1 were prepared. Emulsion stabilizer was dissolved in water in advance and added.

EXAMPLE 6

Using a magnesium material in which a weight mixing ratio of magnesium silicate and tertiary magnesium phosphate is 3:2, 53 parts by weight of PGA was added to 100 parts by weight of a solid matter, and the materials were stirred and mixed to prepare a food additive slurry, which was wet-ground using a Dino mill KD Pilot-type to obtain a highly concentrated food additive slurry. The results of a content M in a magnesium ion in the food additive slurry, a weight average diameter K in a particle size distribution and an amount L of particles of 1 μm or larger in a particle size distribution are shown in Table 1.

As the concentration of the resulting food additive slurry, preparation of a food additive slurry having the magnesium ingredient solid matter concentration of 45% by weight as in Example 1 was tried, but since at that concentration, a viscosity was high and handling was difficult, the slurry was diluted to such the concentration that is not detrimental to handling and, as a result, a slurry having the solid matter concentration shown in Table 1 was prepared.

PGA was dissolved in warm water at 65° C. in advance, and cooled to 20° C. and, thereafter, added.

COMPARATIVE EXAMPLE 4

According to the same conditions as those of Example 6 except that a part by weight an emulsion stabilizer to be added was changed as in Table 2, a food additive slurry was obtained. The results of a content M of a magnesium ion in the food additive slurry, a weight average diameter K in a particle size distribution and an amount L of particles of 1 μm or larger in a particle size distribution are shown in Table 2.

As the concentration of the resulting food additive slurry, preparation of a food additive slurry having the same solid matter concentration as that of Example 6 was tried, but since at that concentration, a viscosity was high and handling was difficult, the slurry was diluted to such the concentration that is not detrimental to handling and, as a result, a slurry having the solid matter concentration shown in Table 2 was prepared.

EXAMPLE 8

According to the same conditions as those of Example 1 except that the conditions were changed to those shown in Table 1, a food additive slurry was obtained. The results of a content M of a magnesium ion in the resulting food additive slurry, a weight average diameter K in a particle size distribution and an amount L of particles of 1 μm or larger in a particle size distribution are shown in Table 1.

As the concentration of the resulting food additive slurry, preparation of a food additive slurry having the magnesium ingredient and magnesium group solid matter concentration of 45% by weight as in Example 1 was tried, but since at that concentration, a viscosity was high and handling was difficult, the slurry was diluted to such the concentration that is not detrimental to handling and, as a result, a slurry having the solid matter concentration shown in Table 1 was prepared.

Sodium hexametaphosphate was dissolved in water in advance and added.

COMPARATIVE EXAMPLE 5

According to the same conditions as those of Example 8 except that a part by weight of an emulsion stabilizer to be added was changed as in Table 2, a food additive slurry was obtained. The results of a content M of a magnesium ion in the food additive slurry, a weight average diameter K in a particle size distribution and an amount L of particles of 1 µm or larger in a particle size distribution are shown in Table 2.

As the concentration of the resulting food additive slurry, preparation of food additive slurry having the same solid matter concentration as that of Example 8 was tried, but since at that concentration, a viscosity was high and handling was difficult, the slurry was diluted to such the concentration that is not detrimental to handling and, as a result, a slurry having the solid matter concentration shown in Table 2 was prepared.

EXAMPLE 9

According to the same conditions as those of Example 1 except that the conditions were changed to those shown in Table 1, a food additive slurry was obtained. The results of a content M of a magnesium ion in the resulting food additive slurry, a weight average diameter K in a particle size distribution and an amount L of particles of 1 µm or larger in a particle size distribution are shown in Table 1.

As the concentration of the resulting food additive slurry, preparation of a food additive slurry having the magnesium ingredient solid matter concentration of 45% by weight as in Example 1 was tried, but since at that concentration, a viscosity was high and handling was difficult, the slurry was diluted to such the concentration that is not detrimental to handling and, as a result, a slurry having the solid matter concentration shown in Table 1 was prepared.

Enzyme-decomposed lecithin was dissolved in water in advance and added.

COMPARATIVE EXAMPLE 6

According to the same conditions as those of Example 9 except that a part by weight of an emulsion stabilizer to be added was changed as in Table 2, a food additive slurry was obtained. The results of a content M of a magnesium ion in the food additive slurry, a weight average diameter K in a particle size distribution and an amount L of particles of 1 µm or larger in an particle size distribution are shown in Table 2.

As the concentration of the resulting food additive slurry, preparation of a food additive slurry having the same solid matter concentration as that of Example 9 was tried, but since at that concentration, a viscosity was high and handling was difficult, the slurry was diluted to such the concentration that is not detrimental to handling and, as a result, a slurry having the solid matter concentration shown in Table 2 was prepared.

EXAMPLE 10

According to the same conditions as those of Example 1 except that the conditions were changed to those shown in Table 1, a food additive slurry was obtained. The results of a content M of a magnesium ion in the resulting food additive slurry, a weight average diameter K in a particle size distribution and an amount L of particles of 1 µm or larger in a particle size distribution are shown in Table 1.

As the concentration of the resulting food additive slurry, preparation of a food additive slurry having the magnesium ingredient solid matter concentration of 45% by weight as in Example 1 was tried, but since at that concentration, a viscosity was high and handling was difficult, the slurry was diluted to such the concentration that is not detrimental to handling and as a result, a slurry having the solid matter concentration shown in Table 1 was prepared.

SE was dissolved in warm water at 65° C. in advance, and cooled to 20° C. and, thereafter, added.

COMPARATIVE EXAMPLE 7

According to the same conditions as those of Example 10 except that a part by weight of an emulsion stabilizer to be added was changed as in Table 2, a food additive slurry was obtained. The results of a content M of a magnesium ion in the food additive slurry, a weight average diameter K in a particle size distribution and an amount L of particles of 1 µm or larger in a particle size distribution are shown in Table 2.

As the concentration of the resulting food additive slurry, preparation of a food additive slurry having the same solid matter concentration as that of Example 10 was tried, but since at that concentration, a viscosity was high and handling was difficult, the slurry was diluted to such the concentration that is not detrimental to handling and, as a result, a slurry having the solid matter concentration shown in Table 2 was prepared.

EXAMPLE 12

According to the same conditions as those of Example 1 except that the conditions were changed to those shown in Table 1, a food additive slurry was obtained. The results of a content M of a magnesium ion in the resulting food additive slurry, a weight average diameter K in a particle size distribution and an amount L of particles of 1 µm or larger in a particle size distribution are shown in Table 1.

As the concentration of the resulting food additive slurry, preparation of a food additive slurry having the magnesium ingredient solid matter concentration of 45% by weight as in Example 1 was tried, but since at that concentration, a viscosity was high and handling was difficult, the slurry was diluted to such the concentration that is not detrimental to handling and, as a result, a slurry having the solid matter concentration shown in Table 1 was prepared.

MC was dissolved in water in advance and added.

COMPARATIVE EXAMPLE 8

According to the same conditions as those of Example 12 except that a part by weight of an emulsion stabilizer to be added was changed as in Table 2, a food additive slurry was obtained. The results of a content M of a magnesium ion in the food additive slurry, a weight average diameter K in a particle size distribution and an amount L of particles of 1 µm or larger in a particle size distribution are shown in Table 2.

As the concentration of the resulting food additive slurry, preparation of a food additive slurry having the same solid matter concentration as that of Example 12 was tried, but since at that concentration, a viscosity was high and handling was difficult, the slurry was diluted to such the concentration that is not detrimental to handling and, as a result, a slurry having the solid matter concentration shown in Table 2 was prepared.

EXAMPLE 13

According to the same conditions as those of Example 1 except that the conditions were changed to those shown in Table 1, a food additive slurry was obtained. The results of a content M of a magnesium ion in the resulting food additive slurry, a weight average diameter K in a particle size distribution and an amount L of particles of 1 µm or larger in a particle size distribution are shown in Table 1.

A viscosity of the resulting highly concentrated food additive slurry was sufficiently low, and there was no problem of the flowability.

Gum arabic was dissolved in water in advance and added.

COMPARATIVE EXAMPLE 9

According to the same conditions as those of Example 13 except that a part by weight of an emulsion stabilizer to be added was changed as in Table 2, a food additive slurry was obtained. The results of a content M of a magnesium ion in the food additive slurry, a weight average diameter K in a particle size distribution and an amount L of particles of 1 µm or larger in a particle size distribution are shown in Table 2.

As the concentration of the resulting food additive slurry, preparation of a food additive slurry having the solid matter concentration as that of Example 13 was tried, but since at that concentration, a viscosity was high and handling was difficult, the slurry was diluted to such the concentration that is not detrimental to handling and, as a result, a slurry having the solid matter concentration shown in Table 2 was prepared.

EXAMPLE 14

According to the same conditions as those of Example 1 except that the conditions were changed to those shown in Table 1, a food additive slurry was obtained. The results of a content M of a magnesium ion in the resulting food additive slurry, a weight average diameter K in a particle size distribution and an amount L of particles of 1 µm or larger in a particle size distribution are shown in Table 1.

As the concentration of the resulting food additive slurry, preparation of a food additive slurry having the magnesium group solid matter concentration of 45% by weight as in Example 1 was tried, but since at that concentration, a viscosity was high and handling was difficult, the slurry was diluted to such the concentration that is not detrimental to handling and, as a result, a slurry having the solid matter concentration shown in Table 1 was prepared.

PGA was dissolved in warm water at 65° C. in advance, and cooled to 20° C. and, thereafter, added.

COMPARATIVE EXAMPLE 10

According to the same conditions as those of Example 14 except that a part by weight of an emulsion stabilizer to be added was changed as in Table 2, a food additive slurry was obtained. The results of a content M of a magnesium ion in the food additive slurry, a weight average diameter K in a particle size distribution and an amount L of particles of 1 µm or larger in a particle size distribution are shown in Table 2.

As the concentration of the resulting food additive slurry, preparation of a food additive slurry having the same solid matter concentration as that of Example 14 was tried, but since at that concentration, a viscosity was high and handling was difficult, the slurry was diluted to such the concentration that is not detrimental to handling and, as a result, a slurry having the solid matter concentration shown in Table 2 was prepared.

EXAMPLE 15

20 parts by weight of gum arabic and 5 parts by weight of water-soluble soybean polysaccharide were added to 100 parts by weight of a solid matter of a magnesium group powder in which a weight mixing ratio of magnesium carbonate (manufactured by Kyowa Chemical Industry Co., Ltd.) and magnesium silicate is 4:3, the materials were stirred and mixed to prepare a food additive slurry, which was wet-ground using Dino mill KD Pilot-type to obtain a highly concentrated food additive slurry. The results of a content M of a magnesium ion in the food additive slurry, a weight average diameter K in a particle size distribution and an amount L of particles of 1 µm or larger in a particle distribution are shown in Table 1.

As the concentration of the resulting food additive slurry, preparation of a food additive slurry having the magnesium group solid matter concentration of 45% by weight as in Example 1 was tried, but since at that concentration, a viscosity was high and handling was difficult, the slurry was diluted to such the concentration that is not detrimental to handling and, as a result, a slurry having the solid matter concentration shown in Table 1 is prepared.

Gum arabic and water-soluble soybean polysaccharide were dissolved in water in advance and added.

COMPARATIVE EXAMPLE 11

According to the same conditions as those of Example 15 except that a part by weight of an emulsion stabilizer to be added was changed as in Table 2, a food additive slurry was obtained. The results of a content M of a magnesium ion in the food additive slurry, a weight average diameter K in a particle size distribution and an amount L of particles of 1 µm or larger in a particle size distribution are shown in Table 2.

As the concentration of the resulting food additive slurry, preparation of a food additive slurry having the same solid matter concentration as that of Example 15 was tried, but since at that concentration, a viscosity was high and handling was difficult, the slurry was diluted to such the concentration that is not detrimental to handling and, as the result, a slurry having the solid matter concentration shown in Table 2 was prepared.

EXAMPLE 16

According to the same conditions as those of Example 1 except that the conditions were changed to those shown in Table 1, a food additive slurry was obtained. The results of a content M of a magnesium ion in the resulting food additive slurry, a weight average diameter K in a particle size distribution and an amount L of particles of 1 μm or larger in a particle size distribution are shown in Table 1.

As the concentration of the resulting food additive slurry, preparation of a food additive slurry having the magnesium group solid matter concentration of 45% by weight as in Example 1 was tried, but since at that concentration, a viscosity was high and handling was difficult, the slurry was diluted to such the concentration that is not detrimental to handling and, as a result, a slurry having the solid matter concentration shown in Table 1 was prepared.

Gum ghatti was dissolved in water in advance and added.

COMPARATIVE EXAMPLE 12

According to the same conditions as those of Example 16 except that a part by weight of an emulsion stabilizer to be added was changed as in Table 2, a food additive slurry was obtained. The results of a content M of a magnesium ion in the food additive slurry, a weight average diameter K in a particle size distribution and an amount L of particles of 1 μm or larger in a particle size distribution are shown in Table 2.

As the concentration of the resulting food additive slurry, preparation of a food additive slurry having the same solid matter concentration as that of Example 16 was tried, but since at that concentration, a viscosity was high and handling was difficult, the slurry was diluted to such the concentration that is not detrimental to handling and, as a result, a slurry having the solid matter concentration shown in Table 2 was prepared.

TABLE 1

| | Kind of magnesium ingredient | Kind of emulsion stabilizer | Amount added of emulsion stabilizer parts by wt. | Food additive slurry concentration % by wt. | M | K | L |
|---|---|---|---|---|---|---|---|
| Example 1 | magnesium silicate | gum arabic | 5 | 45 | 15 | 0.19 | 0.2 |
| Example 2 | magnesium phosphate | processed starch | 20 | 34 | 220 | 0.28 | 1.1 |
| Example 3 | magnesium oxide | arabino galactan | 15 | 35 | 400 | 0.38 | 2.4 |
| Example 4 | magnesium hydroxide | soybean polysaccharide | 45 | 25 | 310 | 0.65 | 14.2 |
| Example 5 | magnesium hydrogen phosphate | gum ghatti | 3 | 38 | 8 | 0.33 | 1.0 |
| Example 6 | magnesium silicate magnesium phosphate | PGA | 53 | 30 | 430 | 0.52 | 7.2 |
| Example 7 | magnesium hydroxide | glycerol | 40 | 25 | 540 | 0.85 | 16.5 |
| Example 8 | magnesium silicate | sodium hexametha- phosphate | 35 | 35 | 920 | 0.42 | 4.5 |
| Example 9 | magnesium oxide | enzyme- decomposed lecithin | 20 | 35 | 480 | 0.58 | 6.2 |
| Example 10 | magnesium phosphate | SE | 18 | 25 | 210 | 0.39 | 0.5 |
| Example 11 | magnesium silicate | CMC | 2.5 | 25 | 6 | 0.52 | 4.1 |
| Example 12 | magnesium hydrogen phosphate | MC | 8 | 30 | 120 | 0.48 | 3.0 |
| Example 13 | magnesium carbonate | gum arabic | 15 | 45 | 145 | 0.28 | 0.2 |
| Example 14 | dolomite | PGA | 2.8 | 30 | 58 | 0.38 | 0.8 |
| Example 15 | magnesium carbonate magnesium silicate | gum arabic soybean polysaccharide | 205 | 35 | 500 | 0.33 | 2.0 |
| Example 16 | dolomite | gum ghatti | 4 | 30 | 80 | 0.72 | 13.1 |

Gum arabic: Abbreviation of desalted gum arabic
Soybean polysaccharide: Abbreviation of water-soluble soybean polysaccharide
PGA: Abbreviation of propylene glycol alginate
Glycerol: Abbreviation of pentaglycerol fatty acid ester
SE: Abbreviation of sucrose fatty acid ester
CMC: Abbreviation of sodium carboxymethyl cellulose
MC: Abbreviation of sodium methyl cellulose
M: A content of magnesium (mg/l) obtained by adjusting a food additive slurry after grinding and/or dispersing to 10% by weight, performing centrifugation at 10,000 rpm for 10 minutes, filtering the supernatant with a 0.8 μm filter to obtain a solution, and measuring an absorbance of a resulting solution using an atomic absorption spectrophotometer AA-6700 F (manufactured by Shimadzu Corporation)
K: A weight average particle diameter (μm) in a particle size distribution of a magnesium ingredient or a magnesium group in a completed product which is measured using a centrifugation settlement particle size distribution measuring apparatus SA-CP-4L (manufactured by Shimadzu Corporation)
L: An amount (%) of particles of 1 μm or larger in a particle size distribution of a magnesium ingredient or a magnesium group in a completed product which is measured using a centrifugation settlement particle size distribution measuring apparatus SA-CP-4L (manufactured by Shimadzu Corporation)

TABLE 2

| | Kind of magnesium ingredient or magnesium group | Kind of emulsion stabilizer | Amount added of emulsion stabilizer parts by wt. | Food additive slurry concentration % by wt. | M | K | L |
|---|---|---|---|---|---|---|---|
| Comp. Ex. 1 | magnesium silicate | gum arabic | 0.8 | 22 | 5 | 0.58 | 13.8 |
| Comp. Ex. 2 | magnesium phosphate | processed starch | 68 | 23 | 900 | 0.35 | 6.6 |
| Comp. Ex. 3 | magnesium hydroxide | soybean polysaccharide | 0.5 | 13 | 4 | 1.20 | 62.1 |
| Comp. Ex. 4 | magnesium silicate magnesium phosphate | PGA | 60 | 20 | 890 | 0.48 | 10.9 |
| Comp. Ex. 5 | magnesium silicate | sodium hexametha-phosphate | 65 | 19 | 1350 | 0.59 | 17.1 |
| Comp. Ex. 6 | magnesium oxide | enzyme-decomposed lecithin | 58 | 16 | 1200 | 0.62 | 20.5 |
| Comp. Ex. 7 | magnesium phosphate | SE | 1.8 | 10 | 13 | 1.08 | 52.0 |
| Comp. Ex. 8 | magnesium hydrogen phosphate | MC | 61 | 15 | 810 | 0.61 | 19.3 |
| Comp. Ex. 9 | magnesium carbonate | gum arabic | 1.6 | 22 | 6 | 0.42 | 98 |
| Comp. Ex. 10 | dolomite | PGA | 57 | 18 | 460 | 0.43 | 10.9 |
| Comp. Ex. 11 | magnesium carbonate magnesium silicate | gum arabic soybean polysaccharide | 0.4 0.7 | 18 | 5 | 1.45 | 72.0 |
| Comp. Ex. 12 | dolomite | gum ghatti | 1.8 | 21 | 3 | 1.11 | 54.7 |

Gum arabic: Abbreviation of desalted gum arabic
Soybean polysaccharide: Abbreviation of water-soluble soybean polysaccharide
PGA: Abbreviation of propylene glycol alginate
SE: Abbreviation of sucrose fatty acid ester
MC: Abbreviation of sodium methyl cellulose
M: A content of magnesium (mg/l) obtained by adjusting a food additive slurry after grinding and/or dispersing to 10% by weight, performing centrifugation at 10,000 rpm for 10 minutes, filtering the supernatant with a 0.8 μm filter to obtain a solution, and measuring an absorbance of a resulting solution using an atomic absorption spectrophotometer AA-6700 F (manufactured by Shimadzu Corporation)
K: A weight average particle diameter (μm) in a particle size distribution of a magnesium ingredient or a magnesium group in a completed product which is measured using a centrifugation settlement particle size distribution measuring apparatus SA-CP-4L (manufactured by Shimadzu Corporation)
L: An amount (%) of particles of 1 μm or larger in a particle size distribution of a magnesium ingredient or a magnesium group in a completed product which is measured using a centrifugation settlement particle size distribution measuring apparatus SA-CP-4L (manufactured by Shimadzu Corporation)

EXAMPLES 17 TO 32, COMPARATIVE EXAMPLES 13 TO 24

The food additive slurry compositions obtained by Examples 1 to 16 and Comparative Examples 1 to 12 were dried by the use of a spray dryer to thus obtain food additive powder compositions.

Next, the food additive powder compositions obtained by Examples 17 to 32 and Comparative Examples 13 to 24 were added into water and stirred at 11000 rpm for 15 minutes by the use of a Homomixer so that re-dispersed suspensions having the same slurry concentrations in solid concentration of the magnesium ingredient and magnesium group as those prior to being powdered were prepared. The viscosities of the re-dispersed suspensions of the food additive powder compositions were nearly the same as those of the food additive slurry compositions before drying and fluidities were quite satisfactory.

The weight average particle diameters K in particle size distributions of the re-dispersed suspensions are shown in Table 3.

TABLE 3

| | K |
|---|---|
| Example 17 | 0.20 |
| Example 18 | 0.28 |
| Example 19 | 0.39 |
| Example 20 | 0.64 |
| Example 21 | 0.33 |
| Example 22 | 0.53 |
| Example 23 | 0.86 |
| Example 24 | 0.43 |
| Example 25 | 0.59 |
| Example 26 | 0.39 |
| Example 27 | 0.51 |
| Example 28 | 0.48 |
| Example 29 | 0.27 |
| Example 30 | 0.38 |
| Example 31 | 0.33 |
| Example 32 | 0.73 |
| Comp. Ex. 13 | 0.57 |
| Comp. Ex. 14 | 0.35 |
| Comp. Ex. 15 | 1.25 |
| Comp. Ex. 16 | 0.49 |
| Comp. Ex. 17 | 0.60 |
| Comp. Ex. 18 | 0.62 |
| Comp. Ex. 19 | 1.10 |
| Comp. Ex. 20 | 0.62 |
| Comp. Ex. 21 | 0.43 |
| Comp. Ex. 22 | 0.44 |

TABLE 3-continued

| | K |
|---|---|
| Comp. Ex. 23 | 1.48 |
| Comp. Ex. 24 | 1.13 |

K: A weight average particle diameter (μm) in particle size distribution of a re-dispersed suspension containing a magesium ingredient and a magnesium group.

Next, the food additive slurry compositions and the re-dispersed suspensions of the powder compositions prepared by Examples 1 to 32 and Comparative Examples 1 to 24 were diluted to 1.2% by weight in solid concentration of the magnesium ingredient and magnesium group. Each of the diluted suspensions was taken into a 100 ml measuring cylinder and left to stand at 10° C. to thus separate a transparent portion caused by precipitates of the magnesium ingredient and a colored portion dispersed by the magnesium ingredient. Changes with time in the interfacial height and the amount of the precipitate were visually inspected and stability of each suspension in water was observed. Scale by ml was read and the results are shown by the following 5-rank evaluation in Tables 4 and 5.

(Interfacial height)

| | |
|---|---|
| Interfacial height is not less than 98 ml and not more than 100 ml: | 5 |
| Interfacial height is not less than 95 ml and less than 98 ml: | 4 |
| Interfacial height is not less than 90 ml and less than 95 ml: | 3 |
| Interfacial height is not less than 50 ml and 90 ml: | 2 |
| Interfacial height is less than 50 ml: | 1 |

(Amount of precipitate)

| | |
|---|---|
| Precipitate is rarely observed: | 5 |
| Precipitate is slightly observed: | 4 |
| Precipitate in about 0.5 mm or less is observed: | 3 |
| Precipitate in not less than 0.5 mm and less than 2 mm is observed: | 2 |
| Precipitate in not less than 2 mm is observed: | 1 |

TABLE 4

| | Interfacial height | | | Amount of precipitate | | |
|---|---|---|---|---|---|---|
| | After 1 day | After 3 days | After 7 days | After 1 day | After 3 days | After 7 days |
| Example 1 | 5 | 5 | 5 | 5 | 5 | 5 |
| Example 2 | 5 | 5 | 5 | 5 | 5 | 5 |
| Example 3 | 5 | 5 | 5 | 5 | 5 | 5 |
| Example 4 | 5 | 4 | 3 | 5 | 4 | 4 |
| Example 5 | 5 | 5 | 5 | 5 | 5 | 5 |
| Example 6 | 5 | 4 | 4 | 5 | 4 | 4 |
| Example 7 | 4 | 3 | 3 | 4 | 4 | 3 |
| Example 8 | 5 | 4 | 4 | 5 | 4 | 4 |
| Example 9 | 4 | 4 | 4 | 4 | 4 | 4 |
| Example 10 | 5 | 5 | 5 | 5 | 5 | 5 |
| Example 11 | 5 | 4 | 4 | 5 | 4 | 4 |
| Example 12 | 5 | 5 | 4 | 5 | 5 | 4 |
| Example 13 | 5 | 5 | 5 | 5 | 5 | 5 |
| Example 14 | 5 | 5 | 5 | 5 | 5 | 5 |
| Example 15 | 5 | 5 | 5 | 5 | 5 | 5 |
| Example 16 | 4 | 4 | 3 | 4 | 4 | 3 |
| Example 17 | 5 | 5 | 5 | 5 | 5 | 5 |
| Example 18 | 5 | 5 | 5 | 5 | 5 | 5 |
| Example 19 | 5 | 5 | 5 | 5 | 5 | 5 |
| Example 20 | 4 | 4 | 3 | 4 | 4 | 3 |
| Example 21 | 5 | 5 | 5 | 5 | 5 | 5 |
| Example 22 | 5 | 4 | 4 | 5 | 4 | 4 |
| Example 23 | 4 | 3 | 3 | 4 | 4 | 3 |
| Example 24 | 5 | 4 | 4 | 5 | 4 | 4 |
| Example 25 | 5 | 4 | 4 | 4 | 4 | 4 |

TABLE 4-continued

| | Interfacial height | | | Amount of precipitate | | |
|---|---|---|---|---|---|---|
| | After 1 day | After 3 days | After 7 days | After 1 day | After 3 days | After 7 days |
| Example 26 | 5 | 5 | 5 | 5 | 5 | 5 |
| Example 27 | 5 | 4 | 4 | 5 | 4 | 4 |
| Example 28 | 5 | 5 | 4 | 5 | 5 | 4 |
| Example 29 | 5 | 5 | 5 | 5 | 5 | 5 |
| Example 30 | 5 | 5 | 5 | 5 | 5 | 5 |
| Example 31 | 5 | 5 | 5 | 5 | 5 | 5 |
| Example 32 | 4 | 4 | 3 | 4 | 4 | 3 |

TABLE 5

| | Interfacial height | | | Amount of precipitate | | |
|---|---|---|---|---|---|---|
| | After 1 day | After 3 days | After 7 days | After 1 day | After 3 days | After 7 days |
| Comp. Ex. 1 | 2 | 1 | 1 | 2 | 1 | 1 |
| Comp. Ex. 2 | 5 | 5 | 5 | 5 | 5 | 5 |
| Comp. Ex. 3 | 1 | 1 | 1 | 1 | 1 | 1 |
| Comp. Ex. 4 | 5 | 4 | 3 | 5 | 4 | 4 |
| Comp. Ex. 5 | 4 | 4 | 4 | 4 | 4 | 4 |
| Comp. Ex. 6 | 4 | 4 | 4 | 4 | 4 | 4 |
| Comp. Ex. 7 | 2 | 1 | 1 | 2 | 1 | 1 |
| Comp. Ex. 8 | 4 | 4 | 3 | 4 | 3 | 3 |
| Comp. Ex. 9 | 2 | 2 | 1 | 2 | 1 | 1 |
| Comp. Ex. 10 | 4 | 3 | 3 | 4 | 3 | 3 |
| Comp. Ex. 11 | 1 | 1 | 1 | 1 | 1 | 1 |
| Comp. Ex. 12 | 2 | 1 | 1 | 2 | 1 | 1 |
| Comp. Ex. 13 | 2 | 1 | 1 | 2 | 1 | 1 |
| Comp. Ex. 14 | 5 | 5 | 5 | 5 | 5 | 5 |
| Comp. Ex. 15 | 1 | 1 | 1 | 1 | 1 | 1 |
| Comp. Ex. 16 | 5 | 4 | 3 | 5 | 4 | 4 |
| Comp. Ex. 17 | 4 | 4 | 4 | 4 | 4 | 4 |
| Comp. Ex. 18 | 5 | 5 | 4 | 5 | 4 | 4 |
| Comp. Ex. 19 | 2 | 1 | 1 | 2 | 1 | 1 |
| Comp. Ex. 20 | 4 | 4 | 3 | 4 | 4 | 3 |
| Comp. Ex. 21 | 2 | 2 | 1 | 2 | 1 | 1 |
| Comp. Ex. 22 | 4 | 3 | 3 | 4 | 3 | 3 |
| Comp. Ex. 23 | 1 | 1 | 1 | 1 | 1 | 1 |
| Comp. Ex. 24 | 2 | 1 | 1 | 2 | 1 | 1 |

EXAMPLE 33

200 g in terms of a magnesium content, of the food additive slurry composition prepared by Example 1 were dispersed in 500 g of butter dissolved at 60° C. This dispersion was added with stirring into defatted milk and the mixture was sterilized to thus obtain a 10 L of magnesium-enriched milk. The magnesium-enriched milk was taken into several measuring cylinders of 100 ml and they were stored at 5° C. The milk was taken out quietly periodically and a change with time in the amount of the precipitate at the bottom of the measuring cylinder was visually inspected. The results were shown by the following 4-rank evaluation in Table 6.

Moreover, the sensory test for flavor of the magnesium-enriched milk was carried out by 10 men and women and the results were shown by the following 5-rank evaluation in Table 6.

(Amount of precipitate)

| | |
|---|---|
| Precipitate is rarely observed: | 4 |
| Precipitate is slightly observed: | 3 |
| Precipitate in a small amount is observed: | 2 |
| Precipitate in a large amount is observed: | 1 |

(Flavor)

| | |
|---|---|
| Flavor is good: | 5 |
| Flavor is slightly concerned about (Incongruity is somewhat felt.): | 4 |
| Flavor is slightly bad (Unpleasantness is somewhat felt.): | 3 |
| Flavor is considerably bad (Unpleasantness is considerably felt.): | 2 |
| Flavor is very bad (Unpleasantness is strongly felt.): | 1 |

EXAMPLES 34 TO 64, COMPARATIVE EXAMPLES 25 TO 48

Magnesium-enriched cow's milks were obtained in the same manner as in Example 33, except that the food additive slurry compositions or the re-dispersed suspensions of the food additive powder compositions prepared by Examples 2 to 32, Comparative Examples 1 to 24 were used and that each magnesium concentration was adjusted to the same concentration as in Example 33. The inspection of the precipitate and sensory test for flavor were performed in the same manner as in Example 33. The results are shown in Tables 6 and 7.

TABLE 6

| | Food additive slurry or re-dispersed suspension of powder | After 3 days | After 7 days | After 14 days | Flavor |
|---|---|---|---|---|---|
| Example 33 | Product of Example 1 | 4 | 4 | 4 | 5 |
| Example 34 | Product of Example 2 | 4 | 4 | 4 | 5 |
| Example 35 | Product of Example 3 | 4 | 4 | 4 | 4 |
| Example 36 | Product of Example 4 | 3 | 3 | 3 | 3 |
| Example 37 | Product of Example 5 | 4 | 4 | 4 | 4 |
| Example 38 | Product of Example 6 | 4 | 4 | 3 | 4 |
| Example 39 | Product of Example 7 | 3 | 3 | 3 | 3 |
| Example 40 | Product of Example 8 | 4 | 4 | 3 | 3 |
| Example 41 | Product of Example 9 | 4 | 4 | 3 | 3 |
| Example 42 | Product of Example 10 | 4 | 4 | 4 | 5 |
| Example 43 | Product of Example 11 | 4 | 3 | 3 | 3 |
| Example 44 | Product of Example 12 | 4 | 4 | 3 | 5 |
| Example 45 | Product of Example 13 | 4 | 4 | 4 | 5 |
| Example 46 | Product of Example 14 | 4 | 4 | 4 | 5 |
| Example 47 | Product of Example 15 | 4 | 4 | 4 | 3 |
| Example 48 | Product of Example 16 | 3 | 3 | 3 | 5 |
| Example 49 | Product of Example 17 | 4 | 4 | 4 | 5 |
| Example 50 | Product of Example 18 | 4 | 4 | 4 | 5 |
| Example 51 | Product of Example 19 | 4 | 4 | 4 | 4 |
| Example 52 | Product of Example 20 | 3 | 3 | 3 | 3 |
| Example 53 | Product of Example 21 | 4 | 4 | 3 | 4 |
| Example 54 | Product of Example 22 | 4 | 4 | 3 | 4 |
| Example 55 | Product of Example 23 | 3 | 3 | 3 | 3 |
| Example 56 | Product of Example 24 | 4 | 4 | 3 | 3 |
| Example 57 | Product of Example 25 | 4 | 4 | 3 | 3 |
| Example 58 | Product of Example 26 | 4 | 4 | 4 | 5 |
| Example 59 | Product of Example 27 | 4 | 3 | 3 | 3 |
| Example 60 | Product of Example 28 | 4 | 4 | 3 | 5 |
| Example 61 | Product of Example 29 | 4 | 4 | 4 | 5 |
| Example 62 | Product of Example 30 | 4 | 4 | 4 | 5 |
| Example 63 | Product of Example 31 | 4 | 4 | 4 | 3 |
| Example 64 | Product of Example 32 | 3 | 3 | 3 | 5 |

TABLE 7

| | Food additive slurry or re-dispersed suspension of powder | After 3 days | After 7 days | After 14 days | Flavor |
|---|---|---|---|---|---|
| Comp. Ex. 25 | Product of Comp. Ex. 1 | 2 | 2 | 2 | 1 |
| Comp. Ex. 26 | Product of Comp. Ex. 2 | 4 | 4 | 4 | 2 |
| Comp. Ex. 27 | Product of Comp. Ex. 3 | 1 | 1 | 1 | 1 |
| Comp. Ex. 28 | Product of Comp. Ex. 4 | 4 | 4 | 3 | 2 |
| Comp. Ex. 29 | Product of Comp. Ex. 5 | 3 | 3 | 3 | 1 |
| Comp. Ex. 30 | Product of Comp. Ex. 6 | 3 | 3 | 2 | 1 |
| Comp. Ex. 31 | Product of Comp. Ex. 7 | 2 | 1 | 1 | 2 |
| Comp. Ex. 32 | Product of Comp. Ex. 8 | 3 | 3 | 3 | 2 |
| Comp. Ex. 33 | Product of Comp. Ex. 9 | 2 | 2 | 1 | 2 |
| Comp. Ex. 34 | Product of Comp. Ex. 10 | 4 | 4 | 3 | 2 |
| Comp. Ex. 35 | Product of Comp. Ex. 11 | 1 | 1 | 1 | 1 |
| Comp. Ex. 36 | Product of Comp. Ex. 12 | 2 | 1 | 1 | 1 |
| Comp. Ex. 37 | Product of Comp. Ex. 13 | 2 | 1 | 1 | 1 |
| Comp. Ex. 38 | Product of Comp. Ex. 14 | 4 | 4 | 4 | 2 |
| Comp. Ex. 39 | Product of Comp. Ex. 15 | 1 | 1 | 1 | 1 |
| Comp. Ex. 40 | Product of Comp. Ex. 16 | 4 | 4 | 3 | 2 |
| Comp. Ex. 41 | Product of Comp. Ex. 17 | 3 | 3 | 3 | 1 |
| Comp. Ex. 42 | Product of Comp. Ex. 18 | 3 | 3 | 2 | 1 |
| Comp. Ex. 43 | Product of Comp. Ex. 19 | 2 | 2 | 1 | 2 |
| Comp. Ex. 44 | Product of Comp. Ex. 20 | 3 | 3 | 3 | 2 |
| Comp. Ex. 45 | Product of Comp. Ex. 21 | 2 | 2 | 1 | 2 |
| Comp. Ex. 46 | Product of Comp. Ex. 22 | 4 | 4 | 3 | 2 |
| Comp. Ex. 47 | Product of Comp. Ex. 23 | 1 | 1 | 1 | 1 |
| Comp. Ex. 48 | Product of Comp. Ex. 24 | 2 | 1 | 1 | 1 |

EXAMPLE 65

15 g in terms of a magnesium content of the food additive slurry composition prepared by Example 1, 2.5 Kg of a commercially available cow's milk, 130 g of butter, 1.2 kg of defatted milk were added into 5 kg of water and homogenized with stirring. After being sterilized and cooled by a normal method, 200 g of a starter preliminarily prepared were inoculated into the mixture, filled into a 180 ml cup, and fermented at 38° C. for 5 hours to thus obtain a magnesium-enriched yogurt.

The sensory test was conducted by 10 men and women with respect to eating impression and flavor and evaluation was made by the following 4-rank criteria, the average values of which are shown in Table 8.

(Eating impression)

| | |
|---|---|
| Texture is not only good, but tongue touch feel is good: | 4 |
| Viscosity is somewhat high or texture is somewhat rough, and tongue touch feel is a little harsh: | 3 |
| Viscosity is fairly high or texture is fairly rough, and tongue touch feel is fairly harsh: | 2 |
| Viscosity is too high or water is released, and tongue touch feel is very harsh: | 1 |

(Flavor)

| | |
|---|---|
| Flavor is good: | 5 |
| Flavor is slightly concerned about (Incongruity is somewhat felt.): | 4 |
| Flavor is slightly bad (Unpleasantness is somewhat felt.): | 3 |
| Flavor is considerably bad (Unpleasantness is considerably felt.): | 2 |
| Flavor is very bad (Unpleasantness is strongly felt.): | 1 |

EXAMPLES 66 TO 68, COMPARATIVE EXAMPLES 49 TO 52

Magnesium-enriched yogurts were obtained in the same manner as in Example 65, except that the food additive slurry compositions or the re-dispersed suspensions of the food additive powder compositions prepared by Examples 6, 17, 22, Comparative Examples 1, 4, 9, 12, were used and that each magnesium content was adjusted to the same concentration as in Example 65. The sensory test was performed in the same manner as in Example 65. The results are shown in Table 8.

TABLE 8

| | Food additive slurry or re-dispersed suspension of powder | Eating impression | Flavor |
|---|---|---|---|
| Example 65 | Product of Example 1 | 4 | 4 |
| Example 66 | Product of Example 6 | 4 | 4 |
| Example 67 | Product of Example 17 | 4 | 4 |
| Example 68 | Product of Example 22 | 4 | 4 |
| Comp. Ex. 49 | Product of Comp. Ex. 1 | 1 | 2 |
| Comp. Ex. 50 | Product of Comp. Ex. 4 | 2 | 1 |
| Comp. Ex. 51 | Product of Comp. Ex. 9 | 1 | 2 |
| Comp. Ex. 52 | Product of Comp. Ex. 12 | 2 | 1 |

INDUSTRIAL APPLICABILITY

As mentioned above, the food additive slurry or powder compositions of the present invention are not only capable of providing highly concentrated products and thus being superior in economical aspect, but are superior in flavor as well as re-dispersibility in liquid. Moreover, the food compositions prepared by the use of the food additive slurry or powder compositions are very excellent in storage stability.

The invention claimed is:

1. A food additive slurry composition which consists of 100 parts by weight of at least one magnesium ingredient selected from the group consisting of magnesium hydroxide, magnesium silicate, and magnesium phosphate,
2 to 55 parts by weight of at least one emulsion stabilizer selected from the group consisting of polyglycerol fatty acid ester, gum arabic, processed starch, sucrose fatty acid ester having an HLB of 8 or higher, carboxymethyl cellulose, methyl cellulose, propylene glycol alginate (hereinafter, referred to as PGA), water-soluble soybean polysaccharide, condensed phosphate, gum ghatti, arabino galactan, and, water.

2. A food additive slurry composition of claim 1, wherein the emulsion stabilizer is at least one selected from the group consisting of polyglycerol fatty acid ester, gum arabic, processed starch, PGA, water-soluble soybean polysaccharide, condensed phosphate, gum ghatti, and arabino galactan.

3. A food additive slurry composition which consists of 100 parts by weight of at least one magnesium group selected from die group consisting of magnesium carbonate, dolomite, magnesium hydroxide, magnesium silicate, magnesium oxide, magnesium phosphate and magnesium hydrogen phosphate, and 2 to 55 parts by weight of at least one emulsion stabilizer selected by the group consisting of gum arabic, PGA, gum ghatti and water-soluble soybean polysaceharide.

4. A food additive slurry composition of claim 3, wherein the magnesium group is magnesium carbonate and/or dolomite.

5. A food additive slurry composition of claims 1 or claim 3, where a magnesium content M (mg/l) of the food additive slimy composition satisfies the following requirement (a):

(a) 5 mg/L≦M≦1000 mg/L

M: a magnesium content (mg/L) of a solution obtained by adjusting a food additive slurry after grinding and/or dispersing to 10% by weight, performing centrifugation at 10,000 rpm for 10 minutes, and filtering the resulting supernatant with a 0.8 μm filters.

6. A food additive slurry composition of claim 1 or claim 3, wherein a magnesium content M (mg;L) of the food additive slurry composition satisfies the following requirement (a):

(a) 7 mg/L≦M≦450 mg/L

M: a magnesium content (mg/L) of a solution obtained by adjusting a food additive slurry after grinding and/or dispersing to 10% by weight, performing centrifligation at 10,000 rpm for 10 minutes, and filtering the resulting supernatant with a 0.8 μm filter.

7. A food additive slurry composition of claim 1 or claim 3, wherein a weight average diameter K (μm) satisfies 0.1 μm≦K≦1.0 μm.

8. A food additive slurry composition of claim 1 or claim 3, wherein a weight average diameterK μm) satisfies 0.1 μm≦K≦0.6 μm.

9. A food additive powder composition which comprises the dried and powdered food additive slurry composition defined in claim 1 or claim 3.

10. A process for preparing the food additive slurry composition defined in claim 1 or claim 3, which comprises using at least one selected from a wet grinding machine, a high pressure emulsifying and dispersing apparatus, and an ultrasonic dispersing machine.

11. A food composition which contains the food additive slurry composition and/or powder composition defined in claim 1 or claim 3.

12. A food additive slurry composition which consists of 100 parts by weight of at least one magnesium ingredient selected from the group consisting of magnesium oxide and magnesium hydrogen phosphate,
2 to 55 parts by weight of at least one emulsion stabilizer selected from the group consisting of gum arabic, processed starch, carboxy methyl cellulose, methyl cellulose, propylene glycol alginate, water-soluble soybean polysaccharide, condensed phosphate, gum ghatti, arabino galactan, and, water.

13. A food additive slurry composition of claim 1 or 12 wherein the emulsion stabilizer is at least one selected from the group consisting of gum arabic, processed starch, PGA, water-soluble soybean polysaceharide, gum ghatti, and arabino galactan.

* * * * *